July 27, 1926.
E. B. FOOTE
1,593,625
REGULATING APPARATUS
Filed June 23, 1924
3 Sheets-Sheet 2
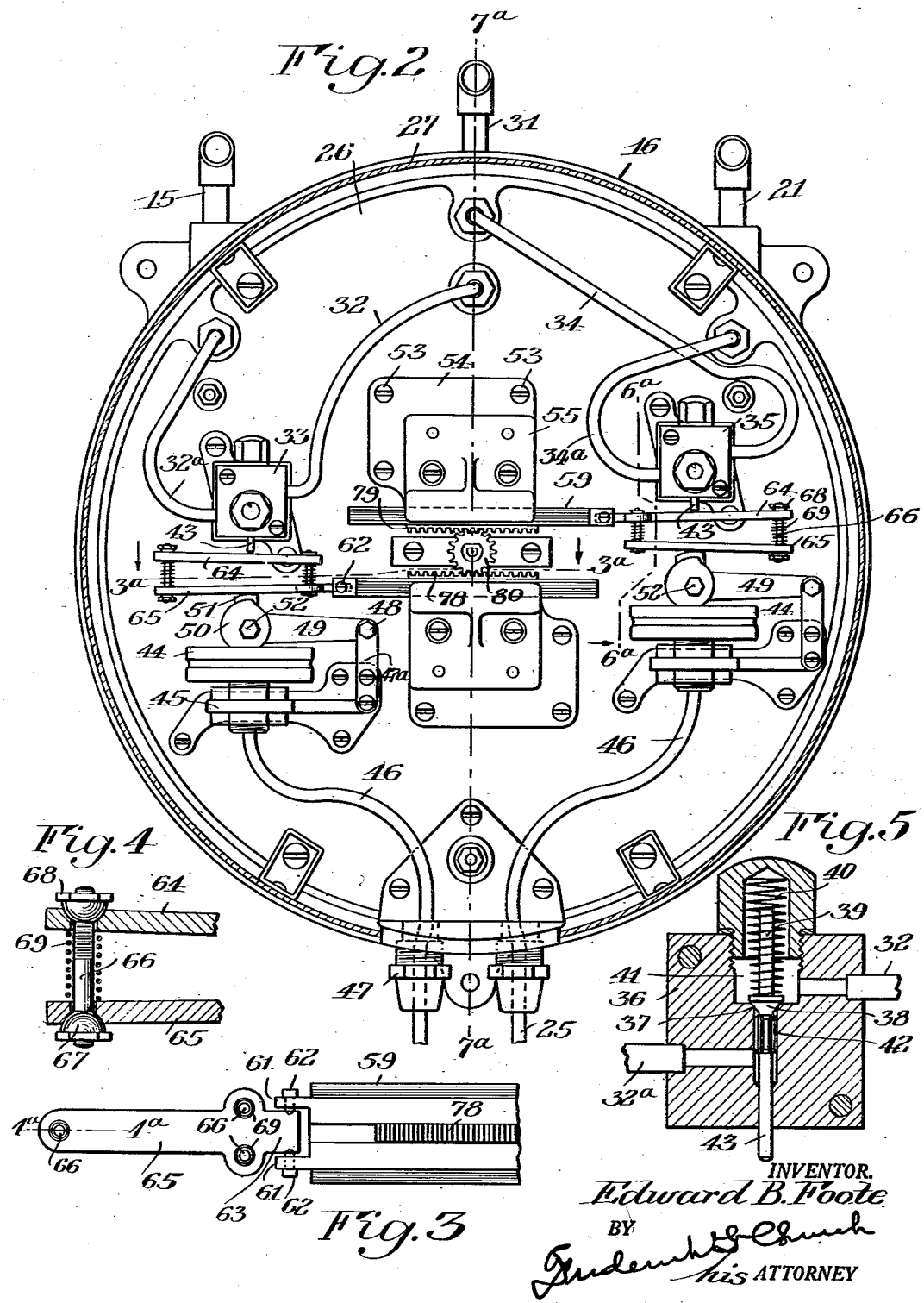
INVENTOR.
Edward B. Foote
BY
his ATTORNEY July 27, 1926.
E. B. FOOTE
REGULATING APPARATUS
Filed June 23, 1924   3 Sheets-Sheet 3
1,593,625
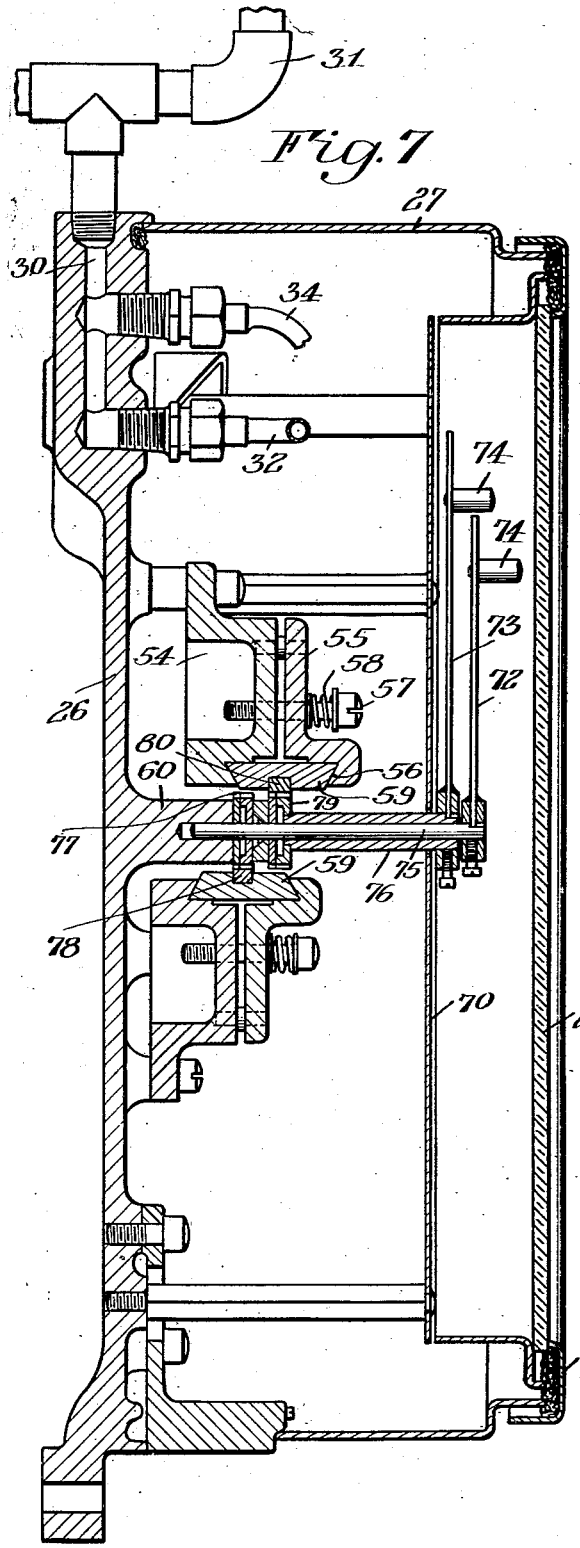
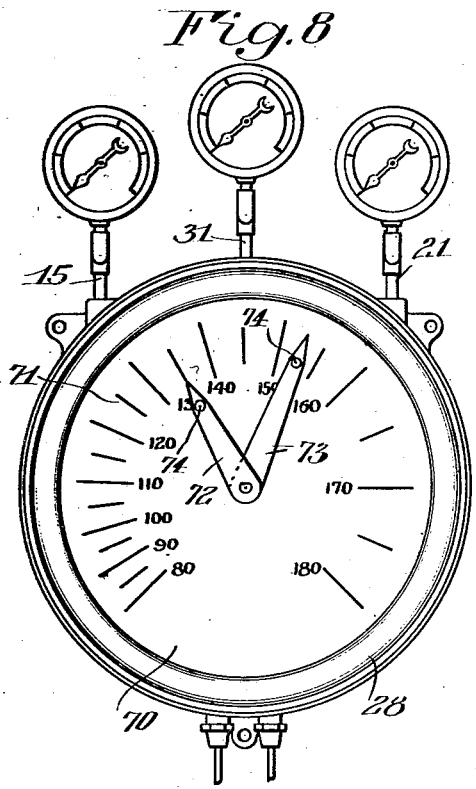
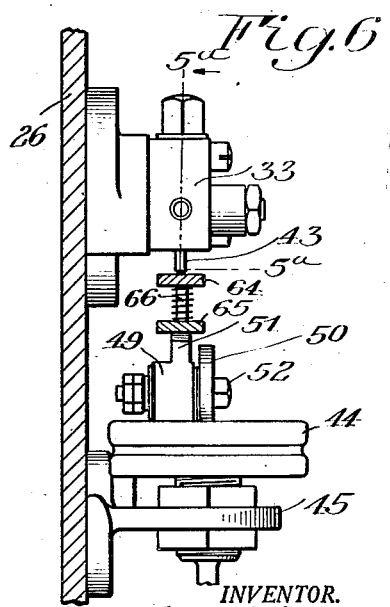
INVENTOR.
Edward B. Foote
BY
Frederick B. Church
his ATTORNEY Patented July 27, 1926.

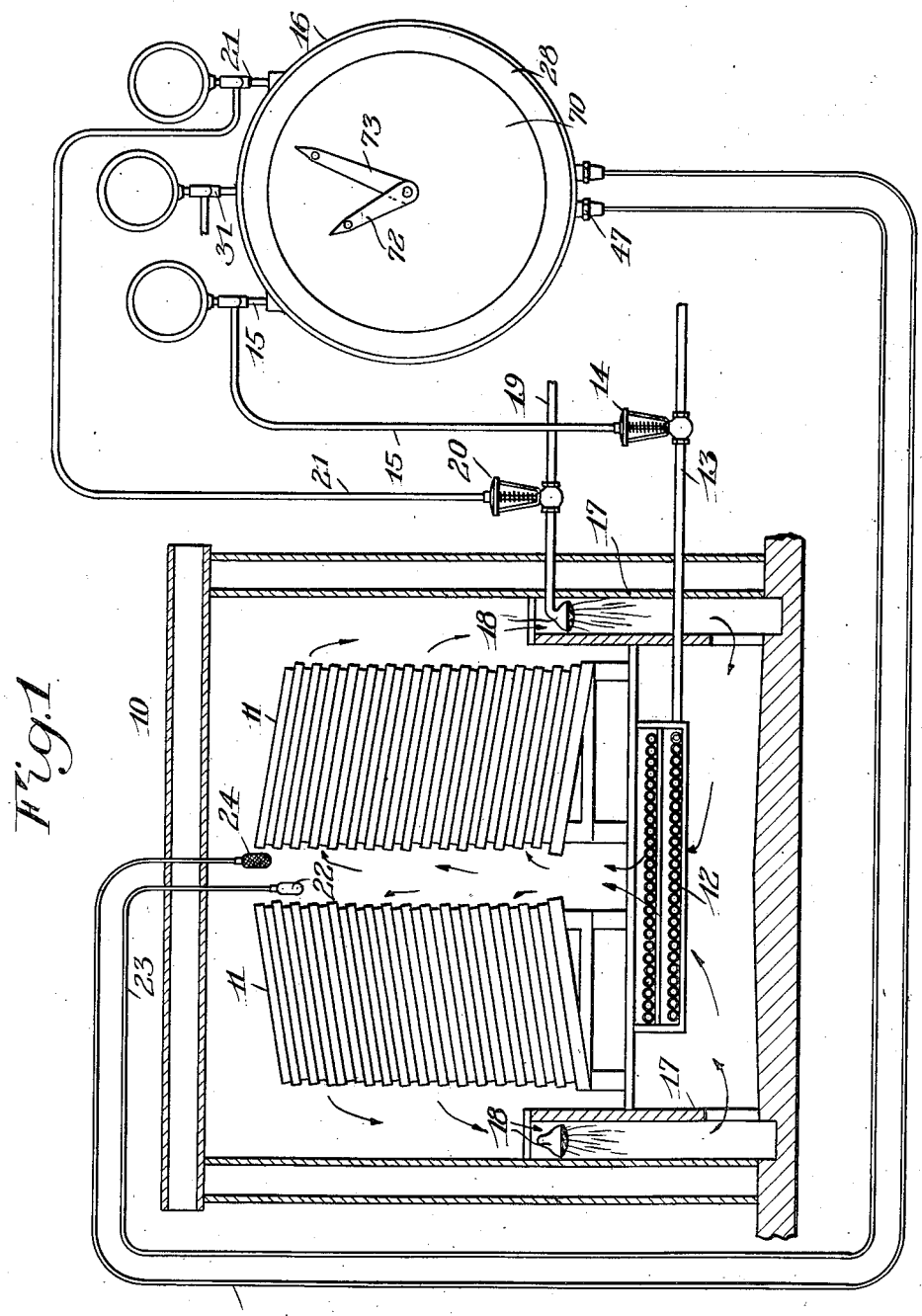

1,593,625

UNITED STATES PATENT OFFICE.

EDWARD B. FOOTE, OF ROCHESTER, NEW YORK, ASSIGNOR TO TAYLOR INSTRUMENT COMPANIES, OF ROCHESTER, NEW YORK, A CORPORATION OF NEW YORK.

REGULATING APPARATUS.

Application filed June 23, 1924. Serial No. 721,960.

This invention relates to regulating apparatus and, more particularly, to the variety in which a device to be regulated, such as a valve, and a sensitive diaphragm or other regulating device, are connected by interposed adjustable means for effecting the desired coordination between them, one object of the invention being to provide an improved apparatus of the above character having a more simple, compact and efficient form of construction, with more convenient and readily visible adjusting means, adapted for use with one or a plurality of valves or other devices to be regulated. A further object is to provide such an instrument, for regulating one or a plurality of valves, having an easily visible dial marked, for example, with a range of temperatures, and one or more indices capable of being conveniently set directly to a predetermined temperature as shown on the dial and provided with means for accurately affecting control at such predetermined temperature.

To these and other ends the invention resides in certain improvements and combinations of parts, all as will be hereinafter more fully described, the novel features being pointed out in the claims at the end of the specification.

In the drawings:—

Figure 1 is a schematic view partly in section of apparatus embodying the present invention applied to the regulation of a lumber drying kiln;

Figure 2 is an enlarged elevation of the regulating apparatus proper with its casing in section to disclose the operating parts;

Figure 3 is an enlarged plan view of parts as seen from line 3ª—3ª in Figure 2;

Figure 4 is an enlarged sectional view on the line 4ª—4ª in Figure 3;

Figure 5 is a sectional view on the line 5ª—5ª in Figure 6, showing a valve;

Figure 6 is a sectional view on the line 6ª—6ª in Figure 2;

Figure 7 is a sectional view on the line 7ª—7ª in Figure 2; and

Figure 8 is a front elevation of the regulating apparatus proper as shown in Figure 1, but somewhat enlarged.

Similar reference numerals throughout the several views indicate the same parts.

The present invention is applicable to a wide variety of uses being shown herein by way of illustration as adapted to the control of the temperature or humidity or both conditions in a lumber drying kiln. The latter is indicated generally at 10, Figure 1, containing piles of lumber 11. At 12, below the latter, are heating coils of the usual or any suitable construction supplied with steam through a pipe 13 controlled by an automatic valve 14 of the diaphragm variety operated, for example, by compressed air, supplied through a pipe 15 leading to the regulating apparatus proper indicated on an enlarged scale at 16. At 17 in the kiln are chambers communicating at top and bottom with the kiln space for the circulation of air and in the top of each such chamber is a spray head 18 each supplied with water through a pipe 19. The latter is controlled by an automatic valve 20 operated by an air line 21 leading to the regulator 16 as described in connection with the steam valve 14. At 22 is a thermometric bulb subjected to a temperature adjacent the lumber and connected by tubing 23 with the regulator 16. A similar bulb 24 is connected by tubing 25 with the regulator, this bulb being encased in an absorbent covering or wick supplied with moisture by any suitable means (not shown). Bulbs 24 and 22 form what is known as wet and dry bulb means for measuring the humidity and temperature in the kiln, these bulbs and the tubing being preferably filled with an expansive fluid medium for transmitting pressures corresponding to different temperatures and humidities to pressure responsive or sensitive means such as capsular diaphragms in the regulator 16, which, as more fully described below, automatically control the steam and water valves 14 and 20 to maintain the desired conditions in the kiln. As the apparatus described above is one well known in the art and forms no part of the present invention, more detailed description thereof appears unnecessary.

The regulating apparatus proper is supported and housed in the present instance in a cylindrical casing comprising a rear supporting wall 26 on which the apparatus is mostly mounted and to which is fixed the cylindrical side walls 27. The forward end of the latter is closed by a removable cover 28, Figure 7, carrying a crystal 29 through which the setting of the apparatus is readily visible.

As already stated, the main valves 14 and 20 are controlled in the present instance by compressed air supplied through pipes 15 and 21 which are connected with passage ways (not shown) formed in the rear wall 26 of the casing similar to the passage way 30, Figure 7, to which air is supplied through a line 31. Air is supplied from the passage 30 to the pipe 15 through a line 32—32ª in the casing controlled by an auxiliary valve 33 hereafter described. Air is supplied from passage 30 to pipe 21 through a line 34—34ª controlled by a similar auxiliary valve 35, these valves being regulated by means comprising the present improvements and in turn controlling the main valves 14 and 20 governing the supply of steam and moisture to the kiln.

Auxiliary valves 33 and 35 have the construction shown in Figure 5, a description of which in connection with valve 33 will serve for both. The valve comprises a block or casing 36 formed with a valve seat 37. The valve is shown at 38 on a stem 39, being pressed toward its seat by a coiled compression spring 40. Air is supplied to the valve chamber 41 through the pipe 32 and the valve controls communication between the latter and a passage 42 with which is connected a line 32ª leading to pipe 15. Connected with the lower side of the valve is a stem 43 projecting downwardly below the casing 36 for engagement and operation by the regulating device hereafter described. It is apparent from this construction that raising of stem 43 tends to unseat the valve and transmit pressure from line 32 through line 32ª to pipe 15 to close the main valve 14 and reduce the supply of steam. Similarly valve 35 is operated to transmit air from line 34 through line 34ª to pipe 21 to reduce the supply of water through valve 20.

The sensitive devices regulating the operation of the valves are in the present instance both in the form of capsular diaphragms 44 of the usual or any suitable construction mounted on brackets 45, Figures 2 and 6, on the rear wall of the casing. These diaphragms have pipes 46 communicating therewith and connected as at 47 in the wall of the casing with the bulb tubing 23 and 25 respectively. Each bracket 45 carries a post 47ª to the upper end of which is pivoted at 48 an arm 49, the other end of which carries a rotarily adjustable cam 50 the periphery of which rests upon the upper surface of the diaphragm. Each arm 49 carries an abutment 51, for a purpose presently to be described, and the spindle of cam 50, which is rotatably carried in arm 49, has a squared forward end 52 by means of which the cam may be rotarily adjusted as it rests upon the diaphragm to adjustably vary the elevation of the abutment 51.

It is desirable in an instrument of this variety to provide a setting and indicating means comprising a dial marked with a scale calculated from a pressure-temperature table, for adjusting the instrument, and it has been found that this may be accomplished in a practical way by the present form of construction which also permits the interchangeable use of diaphragms. The latter, as well known in the art, are subject to some variation even as between samples conforming as nearly as practicable to a given standard with resulting variation in accuracy, and the present construction provides compensating adjustments. To these ends the rear wall 26 of the casing has secured thereto, as by means of screws 53, a pair of opposed brackets 54 to each of which is adjustably secured an extension 55. A dove tail guideway 56, Figure 7, is formed partly in bracket 54 and partly in extension 55 and bolts 57, passing loosely through openings in extension 55 screw into bracket 54 and carry springs 58 between their heads and the extensions for pressing the latter toward the bracket and thus yieldably holding a dove tail block 59 slidable in guideway 56. Such parts are constructed in duplicate and in opposing spaced relation above and below a hub 60 on the rear wall of the casing, for horizontal adjusting movement of the blocks 59 by setting and indicating means carried in hub 60 as described hereafter.

Each block 59 has a bifurcated end, as shown in Figure 3, the arms 61 of which carry pivot screws 62 between which is pivotally supported an end 63 of a spacing means interposed between the corresponding auxiliary valve, as 33, and its sensitive regulating device comprising the diaphragm 44 and the movable abutment 51 actuated thereby. Such spacing means is preferably in the general form of a wedge shaped member of varying width having sides inclined relative to each other so that bodily and lineal movement, for example of the spacing member between and in engagement with each abutment 51 and its corresponding valve stem 43 tends to vary the operating relations of these parts, or in other words, to vary the position of the valve for a given pressure in the diaphragm.

Such adjustable spacing means may have various forms, comprising in the present instance a pair of upper and lower plates 64 and 65, the latter having the end 63 described above as pivotally supported by one of the blocks 59. This lower plate 65, guided by its pivots, rests freely on the diaphragm abutment 51, while the upper plate is arranged for engagement with the valve stem 43, the plates being supported in spaced and inclined relation to each other as by means comprising bolts 66, Figure 4, passed loosely through registering openings in the plates. Each such bolt has a head 67 in engagement with one plate and a nut 68 on its other end in engagement with the other plate, and a spring 69 coiled about the bolt serves to maintain the plates in spaced relation against the bolt head and nut respectively. Preferably three such bolts are employed as shown to support the upper plate 64. The spacing means described above for the two valves 33 and 35 are connected to the opposite ends of the blocks 59, respectively, and each spacing means or wedge member has its thicker portion located at its outer end so that the wedges are arranged in opposed relation, or in other words so that they are moved in opposite directions to effect a similar adjusting result on the corresponding valves.

The setting and indicating means comprises preferably a comparatively large dial 70, Figures 7 and 8, marked with an easily read scale 71 calculated from a pressure-temperature table and marked in the present instance in terms of a range of temperatures. Cooperating with and movable rotarily over this dial are a pair of indices or pointers 72 and 73, each provided with a handle 74 for rotating the same. Index or pointer 72 is fixed on the outer end of a spindle 75 rotatably supported at its inner end in a bearing in stud 60. Rotatably mounted on the spindle is a sleeve 76 on the outer end of which the index 73 is fixed. The spindle and sleeve are connected by rack and pinion means with the lower and upper sliding blocks 59 respectively for moving the same and the wedge members. Thus a pinion 77 is fixed on the spindle and meshes with a rack 78 on the lower block 59. Similarly, a pinion 79 is fixed on sleeve 76 and meshes with a rack 80 on the upper block 59.

It is apparent from this construction that either index or pointer 72 or 73 may be set independently of the other to a predetermined temperature on the dial scale and that such movement adjusts the position of the corresponding spacing means or wedge member, the latter members being moved in opposite directions by movement of the pointers in the same direction but effecting adjustment of the valves in the same sense because of the opposing relation of the wedge members to each other. It is obvious that the regulator may comprise a single diaphragm, valve and index or a plurality of independent indices for a plurality of valves as described and that, after opening the casing cover, each index may be conveniently set to a predetermined temperature to thereby set the regulator to control at that temperature. The index also affords clearly visible means for showing at all times the position of adjustment of the corresponding regulating device or valve. In the present instance the pointer 73 corresponding to the humidity control is set to the temperature corresponding to the predetermined humidity condition.

The instrument may be adjusted to a temperature scale by first moving an index to the highest point of the scale and then bringing up the temperature at the corresponding bulb to this point by adjusting the corresponding diaphragm cam 50. In this position the valve stem is engaged by the wedge opposite the bolts 66 at its smaller end in which position the adjustment of the outer end of the wedge plates does not affect the valve. The index is next moved to the lowest point on the scale and the temperature at the bulb brought to this point by adjusting the outer end of the upper wedge plate 64 by turning the nut 68 of the outer bolt. The index can then be set at any point on the dial and the instrument will accomplish control at such point or temperature, thus affording a direct setting method of operation. For any setting, as previously described, the main valves associated with the regulators are automatically controlled at the predetermined conditions corresponding to the setting. The wedge member furthermore affords advantageous means for compensating for variations in the operation of a diaphragm from a standard, or that different diaphragms may be used interchangeably with corresponding adjustments conveniently made and affording accurate results. The instrument is simple and practical in construction and accurate in operation and is obviously convenient to set in accordance with predetermined conditions, the setting being indicated at all times in a readily visible manner by the comparatively large dial and pointers.

I claim as my invention:—

1. In apparatus of the class described, a valve to be regulated, a sensitive regulating device therefor, spacing means comprising elements having a movement relative to each other and also a common adjusting movement between said valve and device to connect the same in different operating relations, and means for adjusting and indicating the adjustment of said spacing means.

2. In apparatus of the class described, a valve to be regulated, a sensitive regulating device therefor, a wedge-shaped member adjustable bodily between said valve and device to connect the same in different operating relations and means for adjusting and indicating the adjustment of said member.

3. In apparatus of the class described, the combination with a valve and a sensitive device for regulating said valve, of spacing means comprising elements having a movement relative to each other and also a common linear adjusting movement between said valve and device to connect the same in different operating relations and rotary means for adjusting and indicating the adjustment of said spacing means.

4. In apparatus of the class described, the combination with a valve and a sensitive device for regulating said valve, of a member having adjustably tapering sides engaging said valve and device respectively, indicating means and rotary means cooperating with the latter and said member for moving said member and indicating the position thereof.

5. In apparatus of the class described, the combination with a valve and a sensitive device for regulating said valve, of a member having tapering sides engaging said valve and device respectively, a dial, and a rotary index movable over the latter and connected with said member to move the member and indicate the position thereof.

6. In apparatus of the class described, the combination with a valve having a stem, a pressure responsive diaphragm, and means comprising an abutment and a rotarily adjustable cam movably supported between said stem and diaphragm for engagement with one of said last named parts, of a wedge-shaped member movable between said means and the other of said parts, and mechanism for moving and indicating the position of said member.

7. In apparatus of the class described, a valve to be regulated, a sensitive regulating device therefor, a spacing member of varying width movable between said valve and device to connect the same in different operating relations, indicating means comprising a rotarily adjustable index, and rack and pinion means connecting said index and member for moving the latter and indicating the position thereof.

8. In apparatus of the class described, a pair of valves to be regulated, a sensitive regulating device for each valve, a spacing member of varying width movable between each valve and its corresponding regulating device for connecting the same respectively in different operating relations, a dial, concentric indices rotarily adjustable over said dial, and a connection between each of said indices and one of said spacing members for moving the same and indicating the position thereof.

9. In apparatus of the class described, a pair of valves to be regulated, a sensitive regulating device for each valve, adjustable spacing means between each valve and its corresponding regulating device for connecting the same in different operating relations, a dial, concentric indices rotarily adjustable over said dial, and a connection between each of said indices and one of said spacing means for adjusting the same and indicating the position thereof.

10. In apparatus of the class described, a pair of valves to be regulated, a sensitive regulating device for each valve, adjustable spacing means between each valve and its corresponding regulating device for connecting the same in different operating relations, said means being adjustable in opposing relation to each other, a dial, concentric indices rotarily adjustable over said dial, pinions connected with said indices, and racks movable in opposite directions by said pinions during rotation of said indices in the same direction for adjusting said spacing means and indicating the position thereof.

11. In a multiple regulating apparatus, a pair of valves, sensitive devices for regulating the same respectively, a spacing member of varying width movable between each valve and corresponding regulating device for connecting the same in different operating relations, a dial, concentric indices rotatable over said dial, and rack and pinion means connecting each index with one of said spacing members to move the same and indicate the position thereof.

EDWARD B. FOOTE.